United States Patent [19]

Maan

[11] Patent Number: 4,796,252

[45] Date of Patent: Jan. 3, 1989

[54] OPTICAL ASSEMBLY COMPRISING A HOLDER AND AN OPTICAL ELEMENT, AND DEVICE PROVIDED WITH SAID OPTICAL ASSEMBLY

[75] Inventor: Nicolaus Maan, Eindhoven, Netherlands

[73] Assignee: U.S. Philips Corporation, New York, N.Y.

[21] Appl. No.: 71,005

[22] Filed: Jul. 7, 1987

Related U.S. Application Data

[63] Continuation-in-part of Ser. No. 945,718, Dec. 23, 1986, Pat. No. 4,750,826.

[30] Foreign Application Priority Data

Jul. 8, 1986 [NL] Netherlands ................. 8601775

[51] Int. Cl.[4] .................. G11B 7/12; G02B 7/02; G02B 7/18

[52] U.S. Cl. ..................... 369/112; 350/631

[58] Field of Search .................. 369/44–46, 369/112; 350/252, 631

[56] References Cited

FOREIGN PATENT DOCUMENTS

| 90218 | 5/1983 | European Pat. Off. . | |
| 3600781 | 2/1986 | Fed. Rep. of Germany | 350/252 |
| 69611 | 4/1983 | Japan | 350/631 |
| 195811 | 11/1983 | Japan | 350/252 |

Primary Examiner—Donald McElheny, Jr.
Attorney, Agent, or Firm—F. Brice Faller

[57] ABSTRACT

The invention relates to an optical assembly comprising a holder (1) and an optical element (3). The holder has an inner wall (9) on which a plurality of parallel ribs (11) are formed. The optical element has an outer wall (7), a plurality of gaps (13) being formed between this outer wall and the ribs. The optical element is connected to the holder by means of an adhesive which is applied exclusively in said gaps.

4 Claims, 3 Drawing Sheets

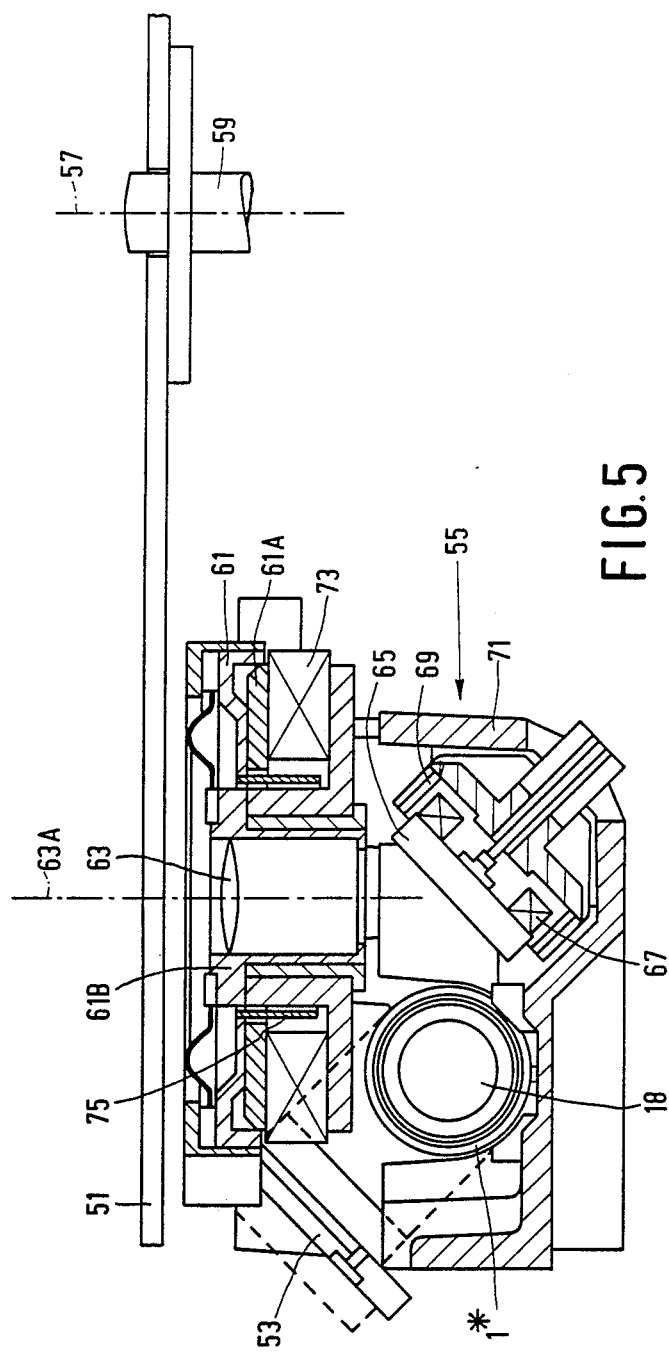

OPTICAL ASSEMBLY COMPRISING A HOLDER AND AN OPTICAL ELEMENT, AND DEVICE PROVIDED WITH SAID OPTICAL ASSEMBLY

This is a continuation-in-part of application Ser. No. 945,718, filed Dec. 23, 1986, now U.S. Pat. No. 4,750,826.

BACKGROUND OF THE INVENTION

The invention relates to an optical assembly with an optical axis, including a holder with an interior space bounded by an inner wall. An optical element mounted in said the holder has an outer wall, an adhesive being applied between the inner wall of the holder and the outer wall of the optical element.

Such optical assemblies are known from EP No. 0090218. The known assemblies each comprise an optical component, such as a round mirror or a lens, and a holder which forms part of an optical apparatus. The holder has a cylindrical bore in which the optical component is mounted, a cylindrical gap being formed between the inner wall of the holder and the outer wall of the optical component in the bore. This gap is wholly or partly filled with an adhesive agent such as a glue.

Optical assemblies are employed in optical apparatuses, such as optical disc players. In such apparatuses it is important that the various optical elements are correctly positioned relative to each other. For the manufacturing process it is therefore essential that the optical elements in the optical assemblies are situated at the correct predetermined locations and in the correct position relative to the holder. Important in this respect is the positional accuracy in the direction of the optical axis (Z-direction) of the optical assembly, in the direction of two axes which extend perpendicularly to the optical axis and to each other (X-direction and Y-direction), and in the directions of rotation about the last-mentioned axes.

In one of the assemblies disclosed in EP No. 0090218 the adhesive is applied in the form of an annular adhesive layer, the layer also adhering to a wall portion of the holder which extends in a plane which is oriented transversely of the optical axis. However, this construction has the disadvantage that as it cures shrinkage of the applied adhesive is inevitable and gives rise to impermissible displacements of the optical component in the Z-direction. Moreover, the likelihood of the optical component being tilted about the X- and Y-axes as a result of shrinkage stresses in the adhesive layer is substantial. The above positioning problem can be mitigated to some extent by reducing the thickness of the adhesive layer in the Z-direction but the required strength and stability of the adhesive bond distinctly limit this possibility. A suitable choice of the adhesive may also reduce said problem, but completely eliminating shrinkage and shrinkage stresses is found to be impossible.

In another optical assembly disclosed in EP No. 0090218 the adhesive is applied in an annular space between the flat inner wall and outer wall. In yet another assembly the outer wall of the optical component is formed with a circumferential groove, the adhesive extending into this groove. These two assemblies both present the problem that the adhesive, which is applied in the form of a liquid or paste, will flow down after application in said space. This may give rise to at least a local formation of a bead of adhesive on the underside of the optical component, which may lead to positioning errors after curing of the adhesive. Moreover, the behaviour of the adhesive in the fairly large gap between the holder and the optical component is not predictable because generally the gap is not rotationally symmetrical as a result of the positioning of the optical component by means of a tool provided for this purpose, so that circumferentially varying shrinkage stresses may arise in the adhesive causing displacements, in particular tilting, of the optical components relative to the holder.

SUMMARY OF THE INVENTION

The invention optical assmebly can be manufactured in a very accurate and reproducible manner by means of simple tools.

On one of the walls at least three ribs are formed whose crests face the other wall, a number of gaps equal to the number of ribs being formed between ribs and the other wall, in which gaps the adhesive is applied. The adhesive is situated exclusively in the predetermined narrow gaps at the location of the ribs, which extend at least substantially parallel to the optical axis of the assembly. This ensures that shrinkage stresses which arise during curing of the adhesive act only in a plane perpendicular to the optical axis, so that during curing no forces and force differences arise in the direction of the optical axis. This has the advantage that after curing of the adhesive the optical element very accurately occupies the predetermined position and orientation. Moreover, the presence of the ribs enables the adhesive to be applied in the gap between the ribs and the facing wall in accurately determined amounts by syringe-like injection means without the need to contact the optical element.

Optical assemblies in accordance with the invention may comprise optical elements of various types, such as lasers, lenses and mirrors and comply with stringent tolerance requirements.

An embodiment of the invention is characterized in that on the inner wall of the holder at least one locating surface is formed, on which surface the optical element bears. It is to be noted that there is no adhesive between the locating surface and the optical element. In principle, the locating surface only has a function in the manufacture of the assembly, in order to position the optical element, and subsequently to retain this element during application of the adhesive and to facilitate curing of this adhesive.

A further embodiment of the invention, in which the inner wall of the holder is cylindrical and the outer wall of the optical element is annular, is characterized in that the ribs are formed on the inner wall of the holder and are spaced uniformly over the inner circumference of the holder, and in that the holder is provided with a plurality of locating surfaces disposed between the ribs.

By providing a specific clearance between the locating surface and the ribs it is ensured that during manufacture of the assembly the adhesive cannot penetrate between the locating surfaces and the optical elements by capillary action. Further, it is to be noted that the adhesive is situated only in the gaps between the ribs and the optical element and, viewed in the Z-direction, is situated only between the ends of the ribs and the bounding edges of the wall facing the ribs, so that during manufacture no beads of adhesive can form. An optical element which is positioned in all directions within tight tolerance limits can be obtained if equal amounts of adhesive are applied in the gaps.

The invention further relates to a device for optically scanning a radiation-reflecting information surface in a record carrier, which device comprises a frame, a radiation source for producing a scanning beam, and an objective for focussing the scanning beam to form a scanning spot in the plane of the information surface, and aims at improving the device in such a way that an accurately predetermined radiation path can be obtained by simple, preferably automated, production methods. To this end the device in accordance with the invention is characterized in that an optical assembly as defined in the appended claim 1, 2 or 3 is secured to the frame in the path of the part of the radiation beam which is situated between the radiation source and the objective.

As a result of the assembly used the device in accordance with the invention can have a short radiation path extending from the radiation source to the objective, which obviously results in a reduced volume of the device. Moreover, the use of the optical assembly simplifies the manufacture of the entire radiation path and renders it better suitable for mass-production methods.

BRIEF DESCRIPTION OF THE DRAWING

FIG. 5 shows schematically a device in which the embodiment shown in FIG. 1 is used.

DETAILED DESCRIPTION OF THE PREFERRED EMBODIMENT

Figure 1:
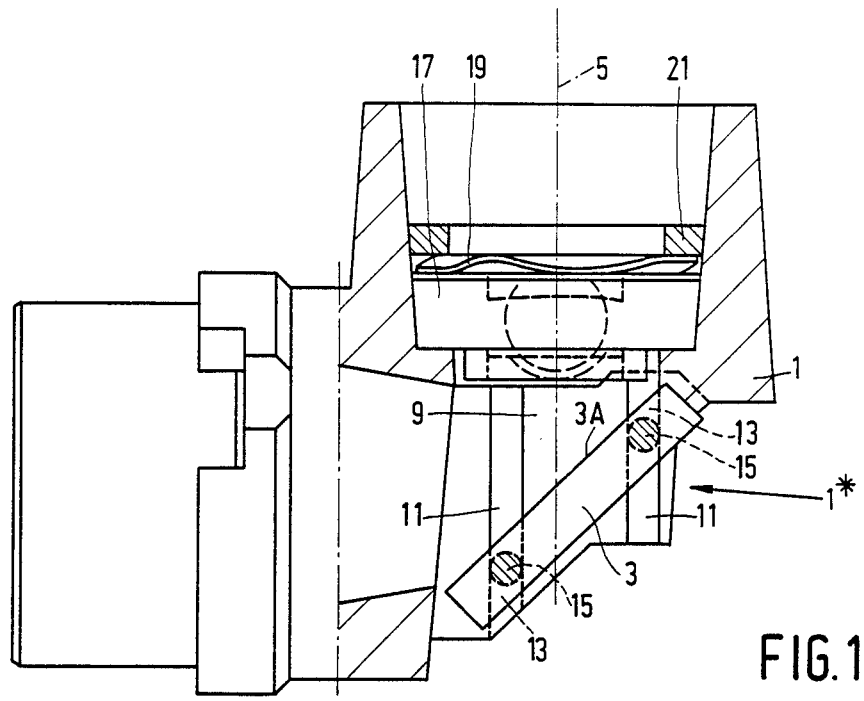
FIG. 1 is a partly sectional view showing the optical assembly in accordance with a first embodiment of the invention.
Figure 2:
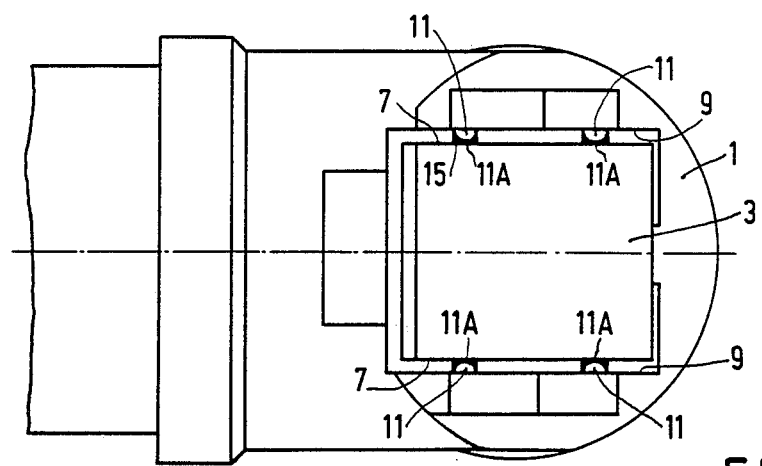
FIG. 2 is an underneath view of the first embodiment.

The optical assembly 1* shown in FIGS. 1 and 2 comprises a holder 1 and a rectangular mirror 3 and has an optical axis 5. The assembly is intended for use in the optical system of an optical-disc player. The holder 1 is constructed as a tubular housing bent into an L-shape, which is provided with a window at the location of the bend. The mirror 3, which has the form of a plane-parallel plate, is secured in the holder 1 in such a way that the optical axis 5 extends at an angle of 45° to the reflecting surface 3A of the mirror 3. On both sides the mirror 3 has a plane outer wall 7 facing a flat inner wall 9 of the holder 1. Two ribs 11 are formed on the inner wall 9 on each side of the mirror 3, which ribs extend parallel to the optical axis 5 of the optical assembly. The ribs 11 have crests 11A facing the outer wall 7 of the mirror 3, narrow gaps 13 being formed between the ribs 11 and the outer wall 7, in which gaps an amount of an adhesive 15, such as a UV curable acrylate resin, is applied. The adhesive is situated exclusively in the gaps 13. Experiments have shown that by means of this method of securing the mirror optical assemblies whose mirrors are positioned within very tight tolerance limits can be manufactured in series. The assembly further comprises a lens with a grating 17 which is secured in the holder 1 by means of a blade spring 19 and a retaining ring 21, which is glued in place.

Figure 3:
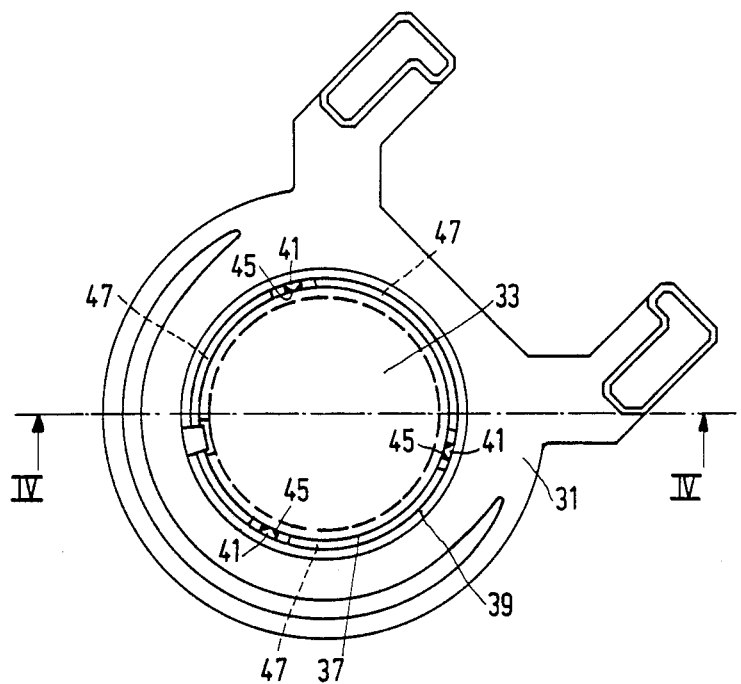
FIG. 3 is a plan view of a second embodiment.
Figure 4:
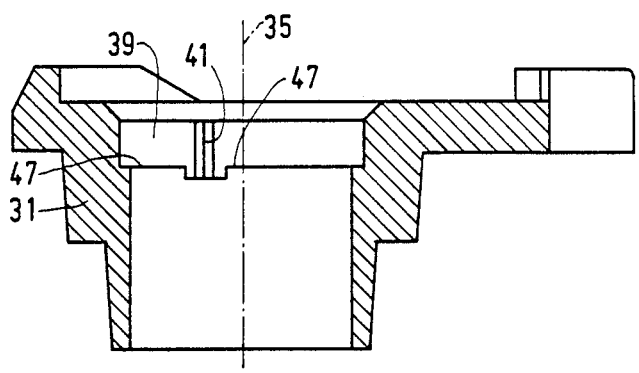
FIG. 4 is a sectional view, taken on the line IV—IV, of the second embodiment without the optical element.

FIGS. 3 and 4 show an annular holder 31 and a laser 33 and having an optical axis 35. The holder has a cylindrical inner wall 39 which bounds a central aperture in the holder 31 in which the laser 33 is mounted. The laser 33 has an annular outer wall 37 which is spaced at some distance from the inner wall 39 of the holder 31, which concentrically surrounds it. The holder is provided with three ribs 41 which extend parallel to the optical axis 35 and which are equidistantly spaced from one another. Between the ribs 41 and the outer wall 37 gaps are formed in which an adhesive 45 is applied in a manner as already described for the assembly shown in FIGS. 1 and 2. Between the ribs 41 inside the holder 1 three locating surfaces 47 are formed. The locating surfaces 47 are situated at some distance from the ribs 41 and extend in a plane which is intersected perpendicularly by the optical axis 35. A mounting face, not shown, of the laser 33 engages with the locating surfaces 47.

FIG. 5 shows a part of an optical disc, in particular a video disc 51. The information of the disc is contained in information tracks which are situated in an information surface and which are read by a scanning beam. The scanning beam is generated by a radiation source 53, for example a semiconductor-diode laser. FIG. 5 further shows schematically a device 55 for reading the video disc 51. The device 55 is provided with said radiation source 53 and the optical assembly 1* as shown in FIGS. 1 and 2, and it further comprises a spindle 59 having a supporting surface for the video disc 51, which spindle is rotatable about an axis of rotation 57, an actuator 61 with an objective 63 with an optical axis 63A, a pivotal mirror 65, and a diverting mirror, not shown.

During operation the radiation beam from the source 53 is passed to a collimator lens 18 via the lens with grating 17 and the mirror 3 present in the optical assembly 1* (see also FIGS. 1 and 2), from which collimator lens the beam is passed to the objective 63 as a parallel beam to be converged to form a scanning spot. Subsequently, the scanning beam is reflected by the information surface of the disc 51 and is modulated in conformity with the information stored in the information tracks. The mirror 3, which is semitransparent, transmits the modulated beam coming from the video disc 51 to a radiation-sensitive detection system, not shown, which supplies electric signals which are modulated in conformity with the information stored in the video disc. Between the optical assembly 1* and the objective 63 the pivotal mirror 65 and said diverting mirror are arranged, the latter serving to reflect the scanning beam issuing from the optical system 1* towards the pivotal mirror 65. The pivotal mirror 65 is caused to oscillate by means of an electrodynamic drive system comprising an annular magnet 67 and a drive coil 69. The pivotal mirror 65 performs a function in a control circuit which is constructed to maintain the scanning spot on the track to be scanned in case of radial deviations from the information tracks of the video disc. For a further description of such a control circuit reference is made to the literature on this subject, for example the article "The Philips VLP-system", Philips Technical Review 33, p.p. 178–193, 1973, No. 7 (herewith incorporated by reference).

The actuator 61, like the optical assembly 1*, is secured to a frame 71 of the device and comprises a stationary part 61A and a movable part 61B. The stationary part 61A comprises an annular permanent magnet 73 adjoined by a magnetic yoke with an air gap in which an annular coil 75 of the movable part 61B is disposed. By energizing the coil 75 the objective 63 can be moved along the optical axis 63A for the purpose of focussing the scanning beam.

Optical assemblies in accordance with the invention which comprise optical elements other than those described and devices provided with such assemblies also fall within the scope of the invention.

What is claimed is:

1. A device for optically scanning a radiation-reflecting information surface in a record carrier, which device comprises a frame, a radiation source for producing a scanning beam, and an objective for focussing the scanning beam to form a scanning spot in the plane of the information surface, wherein an optical assembly having an optical axis is secured to the frame in the path of that part of the radiation beam which is situated between the radiation source and the objective, said assembly comprising a holder with an interior space bounded by an inner wall and an optical element having an outer wall mounted in said holder, the inner wall having formed thereon at least three ribs whose crests face the other wall, a number of gaps equal to the number of ribs being formed between the ribs and the other wall, an adhesive being applied in said gaps.

2. A device as in claim 1 wherein the ribs extend at least substantailly parallel to the optical axis of the assembly.

3. A device as in claim 1 wherein at least one locating surface is formed on the inner wall of the holder, said optical element bearing on said locating surface.

4. A device for optically scanning a radiation-reflecting information surface in a record carrier, which device comprises a frame, a radiation source for producing a scanning beam, and an objective for focussing the scanning beam to form a scanning spot in the plane of the information surface, wherein an optical assembly having an optical axis is secured to the frame, said assembly comprising a holder with an interior space bounded by an inner wall and an optical element having an outer wall mounted in said holder, the inner wall of the holder being cylindrical and the outer wall being annular, the inner wall having formed thereon at least three uniformly spaced ribs whose crests face the outer wall, said ribs extending at least substantially parallel to the optical axis of the assembly, a number of gaps equal to the number of ribs being formed between the ribs and the outer wall, an adhesive being applied in said gaps, a plurality of locating surfaces being provided on the holder between the ribs.

* * * * *